March 30, 1954
F. A. THAHELD
2,673,554
METHOD OF OPERATING SPARK IGNITION ENGINES
Filed Feb. 13, 1950
2 Sheets-Sheet 1
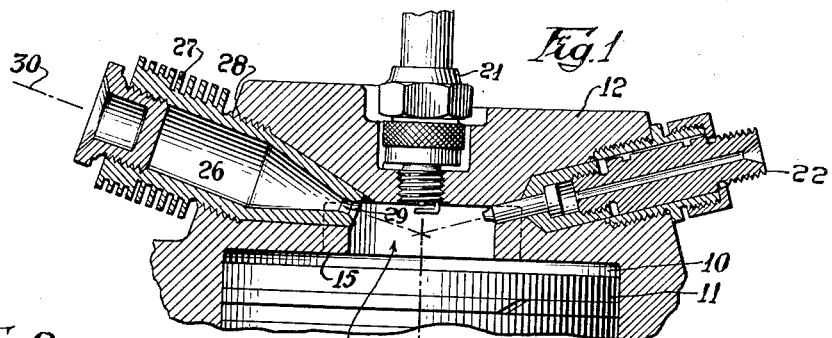
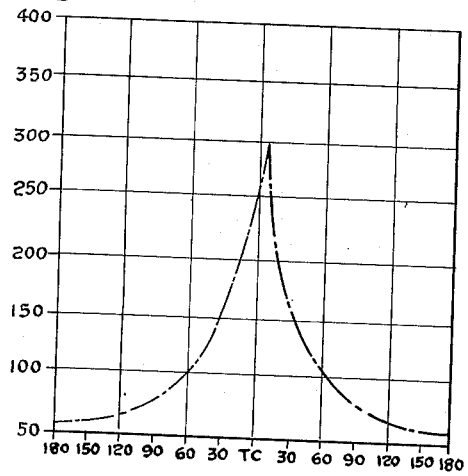
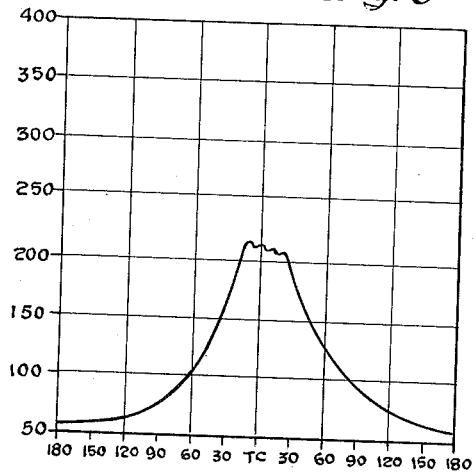
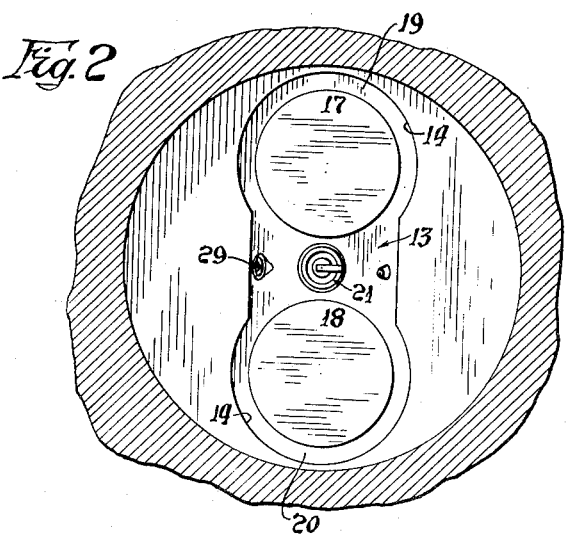
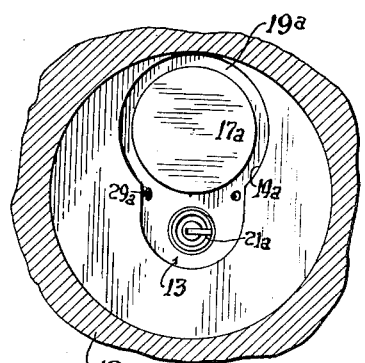
INVENTOR.
Fred A. Thaheld
BY Lyon & Lyon
Attorneys March 30, 1954 F. A. THAHELD 2,673,554
METHOD OF OPERATING SPARK IGNITION ENGINES
Filed Feb. 13, 1950 2 Sheets-Sheet 2
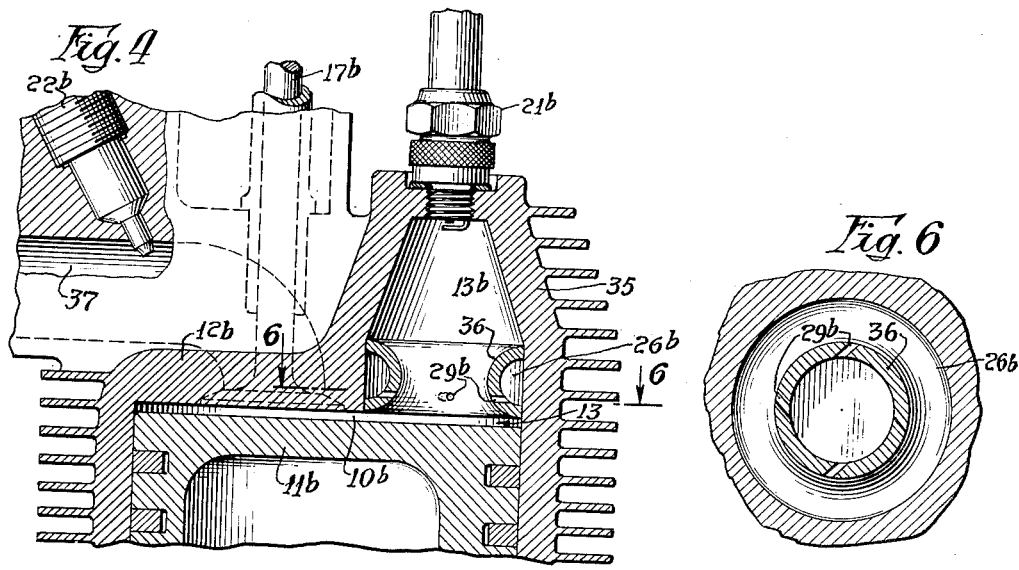
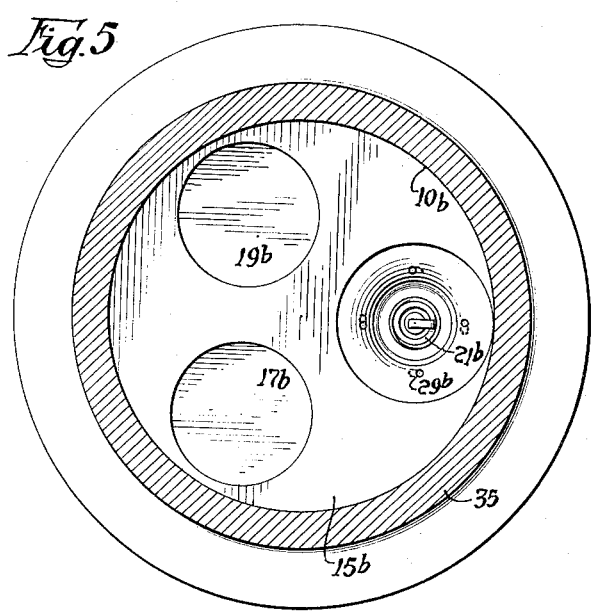
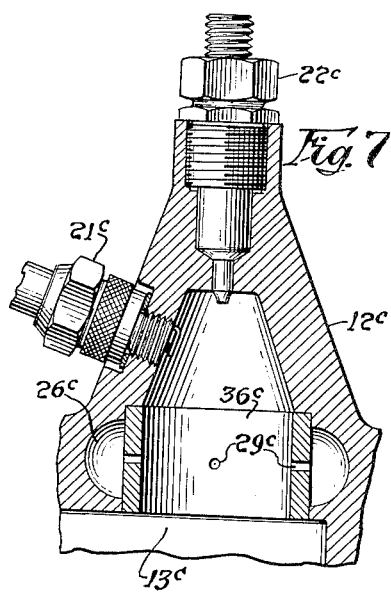
INVENTOR.
Fred A. Thaheld,
BY
Lyon & Lyon
Attorneys.

Patented Mar. 30, 1954

2,673,554

UNITED STATES PATENT OFFICE 2,673,554

METHOD OF OPERATING SPARK IGNITION ENGINES

Fred A. Thaheld, Brea, Calif., assignor to Diesel Power, Inc., Los Angeles, Calif., a corporation of Pennsylvania Application February 13, 1950, Serial No. 144,000

1 Claim. (Cl. 123—32)

This invention relates to a combustion chamber of the type used in fuel burning engines and is particularly directed to an improved means for progressive burning of a fuel by a series of rapid, relatively small detonations. The present invention is particularly useful as applied to the combustion chamber of a spark ignition engine.

In my Patent No. 2,534,322 for Method of Operating Diesel Type Internal Combustion Engines, granted December 19, 1950, I have described a related invention in connection with a combustion chamber for a compression ignition engine of the diesel type. The present application relates to improvements in engines which operate with spark ignition rather than compression ignition.

The principal object of this invention is to provide a combustion chamber for progressive burning of a fuel in a series of rapid pulsations.

Another object of this invention is to provide a novel form of combustion chamber for use in connection with a spark ignition engine in which maximum fuel economy is obtained.

Another object is to provide a combustion chamber of this type applicable to engines employing solid injection of fuel and also to engines introducing fuel by carburetion.

Another object is to provide a combustion chamber for spark ignition engines which promotes smooth application of power to the piston by avoiding objectionably high peak pressures.

In broad terms, I seek to accomplish smooth application of power, fuel economy and efficient combustion by progressively burning a fuel in a series of relatively small rapid detonations. This purpose I accomplish by injecting a solid stream of fuel or admitting a combustible mixture of air and fuel into the main combustion chamber. The first particles of fuel to be ignited by the spark causes turbulence which results in ignition of additional atomized fuel particles. This initial phase of combustion takes place when the piston is near the top center position, and subsequent downward movement of the piston permits expansion of the gases in the combustion chamber so that pressure in the main combustion chamber is in fact slightly lowered. Air previously compressed in an auxiliary air chamber flows rapidly therefrom, causing additional turbulence and intimate mixing of the unburned fuel. In turn, this effects a substantial increase in the rate of combustion in the main chamber and the consequent sudden build-up of pressure causes reverse flow of gases from the main chamber into the auxiliary chamber or air cell. The return flow of gases carries some unburned fuel into the air cell which ignites there under compression and causes a second blast of compressed air and combustion products to be directed into the main chamber. This second jet again creates additional turbulence and supplies more oxygen for combustion, which in turn raises the combustion rate and produces a second sudden pressure rise. The combustion, therefore, does not proceed uniformly, but on the contrary is composed of a series of interacting detonations between the main chamber and the auxiliary chamber or air cell which continue until the entire fuel charge has been consumed.

A preferred form of construction for accomplishing this mode of operation is shown in the accompanying drawings in which:

Figure 1 is a sectional view through the upper portion of the cylinder of a spark ignition type engine showing a preferred form of combustion chamber and its associated parts.

Figure 2 is an underneath view partly broken away of the device shown in Figure 1, the piston being omitted.

Figure 3 is a view similar to Figure 2 showing a modified form of my invention.

Figure 4 is a view similar to Figure 1 showing a modified form of engine embodying my invention.

Figure 5 is an underneath view of the apparatus shown in Figure 4, the piston being omitted.

Figure 6 is a sectional view taken substantially on the lines 6—6 as shown in Figure 4.

Figure 7 is a sectional view partly broken away, similar to Figure 4, showing a further modified form of my invention.

Figure 8 is a diagram showing a typical time-pressure curve for a conventional spark-ignition engine.

Figure 9 is a diagram similar to Figure 8 showing a typical time-pressure curve for a spark-ignition engine embodying my invention.

The cylinder 10 receives the piston 11 which is shown in its top dead-center position. In the head 12 of the engine above the cylinder 10 and opening into the cylinder 10 is a double lobe-shaped combustion chamber 13 having side walls 14 defining a substantially figure-8 shaped section and an end wall 15 lying in a plane perpendicular to the axis 16 of the cylinder 10. The combustion chamber 13 extends transversely substantially the entire area of the piston 11 and encircles the ports (not shown) closed by the inlet valve 17 and the exhaust valve 18. Mounted symmetrically between the lobes 19 and 20 and projecting into the combustion chamber 13 is a conventional form of spark plug 21.

Mounted on the head 12 and arranged symmetrically of the lobes 19 and 20 is a housing 27 providing an auxiliary chamber or air cell 26. The housing 27 is secured to the head 12 by means of threads 28. The housing 27 is reduced in cross-section toward its inner end to define a restricted orifice 29 at the point where the auxiliary chamber or air cell 26 communicates with the combustion chamber 13. The housing 27 is mounted on the head 12 so that its axis of symmetry 30 intersects the axis 16 of the cylinder. An injector nozzle 22 is provided for introducing liquid fuel, such as gasoline, into the combustion chamber 13 in timed relation to motion of the piston 11.

It is important that the initial combustion commence in the main combustion chamber, and that the only unburned fuel entering the air cell 26 shall do so after the initial pressure rise has occurred in the main chamber 13. The size of the auxiliary chamber 26 should be from 10% to 50% of the total volume of the compressed air or combustible mixture when the piston is at its top dead-center position.

In the operation of the apparatus described, as the piston 10 approaches its upper dead-center position the fuel is injected by the nozzle 22 and the spark plug ignites the combustible mixture in the main chamber. Ignition first occurs in the atomized particles adjacent the spark and the resulting turbulence breaks up the larger fuel globules for more intimate mixing.

The fuel is injected in solid streams and continues until the piston has moved downwardly in its power stroke. The core of the ejected streams is relatively solid fuel and with very little mixing of air, whereas the outer fringes of the streams are highly atomized and mix intimately with the air in the combustion chamber 13.

Fuel is injected into the combustion chamber in a rather coarse state but in such manner as to be substantially evenly distributed throughout the entire confines of the chamber without direct injection of any of the fuel into the auxiliary cell. Injection of the fuel is completed at about the same time the piston reaches top dead center so that combustion commences at that time. The stream of fuel injected is made up largely of relatively coarse droplets, and only a minor percentage of the fuel is finely atomized, and consequently burning of the fuel at the start is quite slow.

The downward stroke of the piston then permits expansion of the gases in the combustion chamber at a rate somewhat greater than that due to combustion alone so that the pressure in the main combustion chamber is in fact lowered slightly. Upon this lowering of the pressure in the main chamber, compressed gases in the auxiliary chamber 26 expand and shoot out in jet form from the restriction 29 into the main combustion chamber. The jet is so directed as to cause maximum turbulence of the gases in the main combustion chamber, thus more intimately mixing unburned fuel and oxygen therein and also supplying and mixing additional oxygen from the cell 26 with the gases in the chamber. This turbulence and added oxygen causes a substantial increase in the rate of combustion in the main chamber which produces a sudden spurt of pressure sufficiently high to cause reverse flow of gases into the cell 26. The gases now moving into cell 26 include some unburned fuel. When the unburned fuel enters the cell 26, in which there is an excess of oxygen, compression ignition again takes place and high pressure is developed in the cell. By this time the piston will have moved downwardly enough to again relieve the pressure in the combustion chamber to a point below that in the cell 26, and the pressure therein, caused by the combustion therein just described, produces a second jet from the cell into the combustion chamber to again thoroughly mix the gases therein and add new oxygen thereto, thus commencing a repetition of the cycle previously described.

This mode of operation constitutes a control of the combustion of fuel in the engine, resulting in more complete combustion and the avoidance of shock loads on the pistons and bearings. The graph line shown in Figure 8 shows a typical pressure curve for a conventional spark ignition engine. The curve shown in Figure 9 represents a typical pressure curve for a spark-ignition engine incorporating my invention and showing that the maximum unit pressure in the cylinder is considerably less than that for the conventional engine. It will be understood that the ordinates in Figures 8 and 9 represent pounds per square inch, whereas the abscissae represent the position of the piston as controlled by the angular position of the crank (not shown). "TC" represents top center position.

The modification illustrated in Figure 3 of the drawings embodies a single lobe 19a instead of the double lobe construction described above. The numerals applied to Figure 3 are similar to those previously used but the suffix "a" has been added in each case. The method of operation employed in this modified form of my invention is similar in all respects to that described for the double lobe arrangement shown in Figure 2.

In the modified form of my invention shown in Figures 4, 5 and 6, the numerals are similar to those previously used but the suffix "b" has been added in each case. The cylinder head 12b is shaped closely to conform to the upper surface of the piston 11b when the latter is in its top center position. The main combustion chamber 13 extends into a space 13b provided within walls 35 of the cylinder head 12b. An auxiliary combustion chamber, or air cell 26b, is provided by the metallic insert 36 which is toroidal in shape. Ports 29b interconnect the auxiliary chamber 26b with the main chamber 13b. The fuel injector 22b is mounted on the head 12b so that the fuel is injected into the air intake passageway 37. This passageway 37 communicates with the main combustion chamber 13 whenever the inlet valve 17b is open. The injector 22b operates in timed relation with the piston 11b and sprays liquid fuel into the passageway 37 when the valve 17b is open to permit an air stream to enter the combustion chamber 13 through the passageway 37.

In the further modification shown in Figure 7, the shape and construction of the air cell is changed somewhat but the method of operation is the same. In this form of my invention the air cell 26c is formed as an annulus in the cylinder head 12c and a cylindrical insert 36c forms the inner wall of the air cell. Ports 29c provide communication from the air cell 26c to the main combustion chamber 13c.

The method of operation of the forms of my invention shown in Figures 4 to 6 and in Figure 7 are substantially identical to that described in detail above.

It is recognized that it is even possible to employ a construction wherein solid fuel is injected into the main combustion chamber by an injector aimed directly into a port communicating with the auxiliary air chamber. In such a construction the spark plug is located to one side and not in the path of travel of the injected fuel. In such a construction the timing of the injection of the fuel slug must be set to occur on the downstroke of the piston so that the fuel slug is ignited and consumed before any substantial part thereof enters the air cell. In this way the combustion is initiated in the main combustion chamber followed by expansion of compressed air from the air cell into the air chamber. The resulting turbulence and addition of oxygen raises the combustion rate in the main chamber so that a rapid rise in pressure occurs to force a flow of gases and unburned fuel back into the air cell. The interacting detonations characteristic of my invention then occur between the air cell and main combustion chamber.

While I have shown and described my invention in connection with spark-ignition engines having fuel injectors, it is also possible to employ my invention in connection with spark-ignition engines having carburetors which mix fuel with the air stream before it enters the combustion chamber. In such a case the beneficial effects resulting from lowering of the maximum unit pressure are achieved, but fuel economy is not employed to the same extent as it is with engines employing fuel injectors.

Having fully described my invention, it is to be understood that I do not wish to be limited to the details herein set forth, but my invention is of the full scope of the appended claim.

I claim:

The method of operating a spark-ignition engine having a combustion chamber defined by a cylinder and a reciprocable piston therein, and an auxiliary chamber communicating with said combustion chamber through a restricted passageway, comprising the steps of: compressing a charge of air in said chambers to a pressure below that required for compression-ignition by moving said piston in one direction, injecting fuel through the said combustion chamber at the completion of said piston movement, directing said injected fuel to prevent projection thereof into said auxiliary chamber, igniting the mixture of fuel and air by means of a spark, immediately moving said piston in the other direction at a rate to reduce the pressure in said combustion chamber below that in the said auxiliary chamber while said injected fuel is burning, whereby a jet of air is caused to issue from said auxiliary chamber into said combustion chamber, directing said air jet to cause maximum turbulence and to increase the rate of combustion in said combustion chamber and thereby cause a rapid rise in pressure sufficient to cause reverse flow of some unburned fuel into said auxiliary chamber where said fuel burns and expands and causes another jet to be projected into said combustion chamber to repeat the described cycle.

FRED A. THAHELD.

References Cited in the file of this patent

UNITED STATES PATENTS

| Number | Name | Date |
|---|---|---|
| 1,954,083 | Lang | Apr. 10, 1934 |
| 1,998,978 | Broege | Apr. 23, 1935 |
| 2,000,225 | Fisher et al. | May 7, 1935 |
| 2,036,253 | Bremser | Apr. 7, 1936 |
| 2,076,030 | Kahllenberger | Apr. 6, 1937 |
| 2,098,031 | Essl | Nov. 2, 1937 |
| 2,457,652 | Fisher | Dec. 28, 1948 |
| 2,534,322 | Thaheld | Dec. 19, 1950 |

FOREIGN PATENTS

| Number | Country | Date |
|---|---|---|
| 180,800 | Great Britain | June 8, 1922 |
| 341,638 | Great Britain | Jan. 22, 1931 |
| 362,146 | Great Britain | Dec. 3, 1931 |